United States Patent
Babich

[15] 3,685,771
[45] Aug. 22, 1972

[54] SECURING DEVICES TO BE USED WITH AIRCRAFT

[72] Inventor: Herman B. Babich, 152 Clarkson Ave., Brooklyn, N.Y. 11226

[22] Filed: Feb. 26, 1971

[21] Appl. No.: 119,303

[52] U.S. Cl. .............................................. 244/115
[51] Int. Cl. ............................................. B64f 1/16
[58] Field of Search ............................ 244/115, 116

[56] References Cited

UNITED STATES PATENTS

| | | | |
|---|---|---|---|
| 2,957,661 | 10/1960 | Bergh et al. | 244/115 |
| 3,497,167 | 2/1970 | Adams et al. | 244/115 |

*Primary Examiner*—Milton Buchler
*Assistant Examiner*—Paul E. Sauberer
*Attorney*—Steinberg & Blake

[57] ABSTRACT

Securing devices to be used with aircraft for securing the aircraft to the ground. The securing devices include a rear securing device operatively connected with the tail region of the fuselage of the aircraft and a pair of forward securing devices operatively connected with a wing extending laterally from the fuselage with the forward securing devices situated equidistant from the fuselage. The rear securing device has an expanded position extending and compressed between the fuselage and the ground while having a length sufficiently great to place the wing at a negative angle of incidence. The pair of forward securing devices have expanded positions extending and compressed between the wing and the ground.

10 Claims, 14 Drawing Figures

PATENTED AUG 22 1972 3,685,771
FIG.1
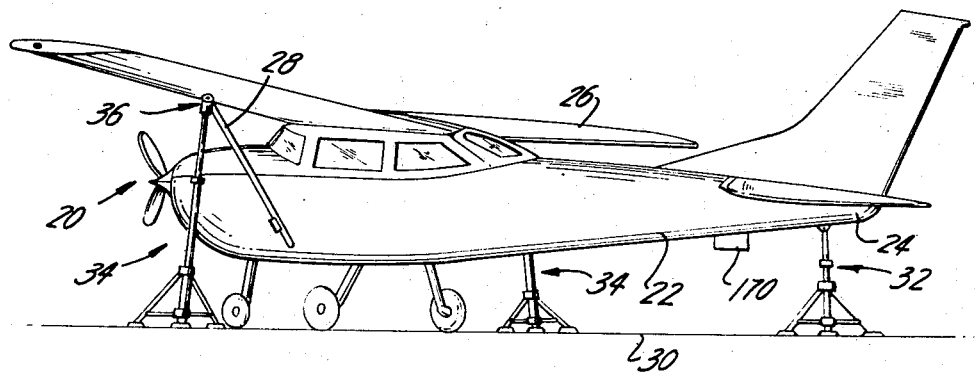
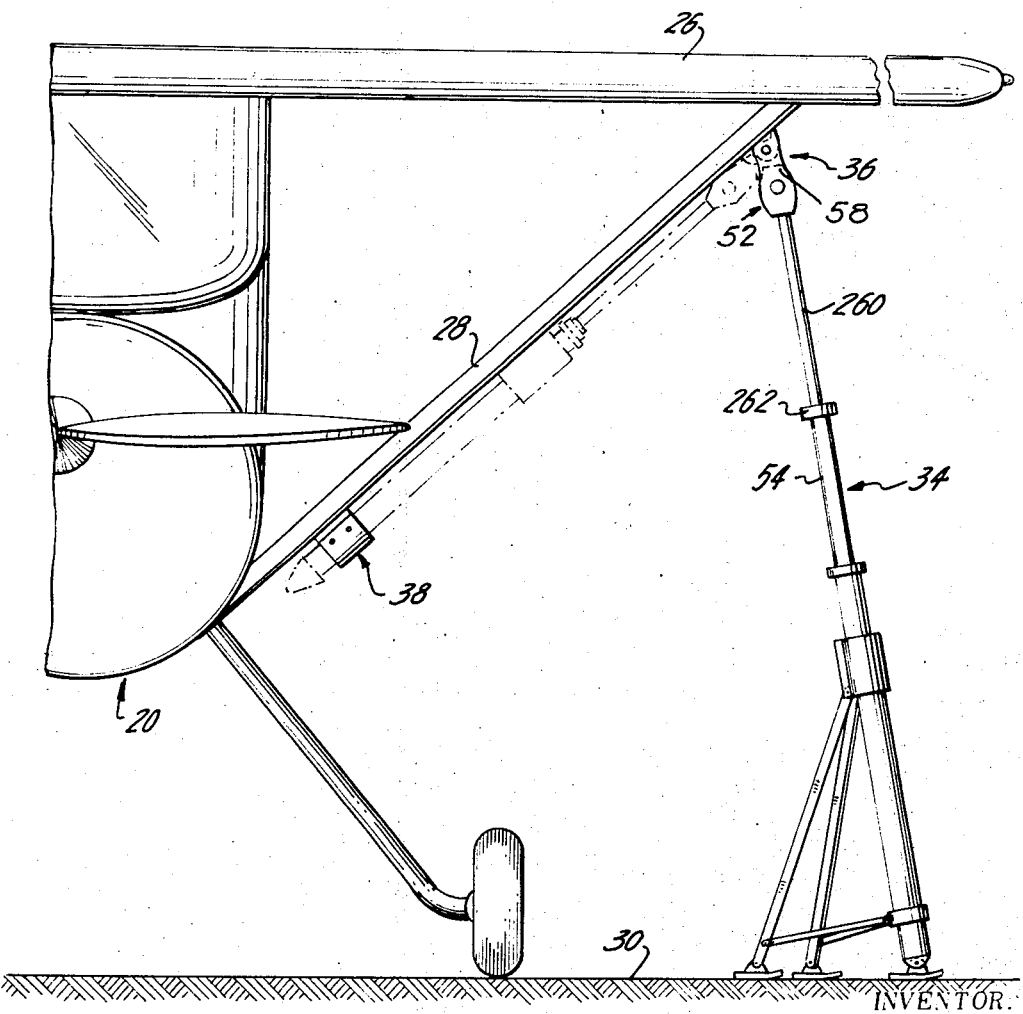
FIG.2
INVENTOR.
HERMAN B. BABICH
BY
Steinberg and Blake
ATTORNEYS

PATENTED AUG 22 1972

INVENTOR.
HERMAN B. BABICH

BY Steinberg and Blake
ATTORNEYS

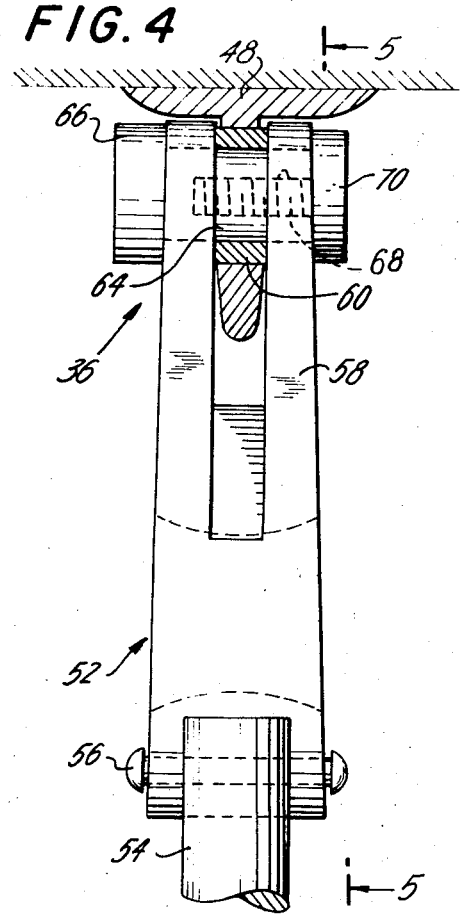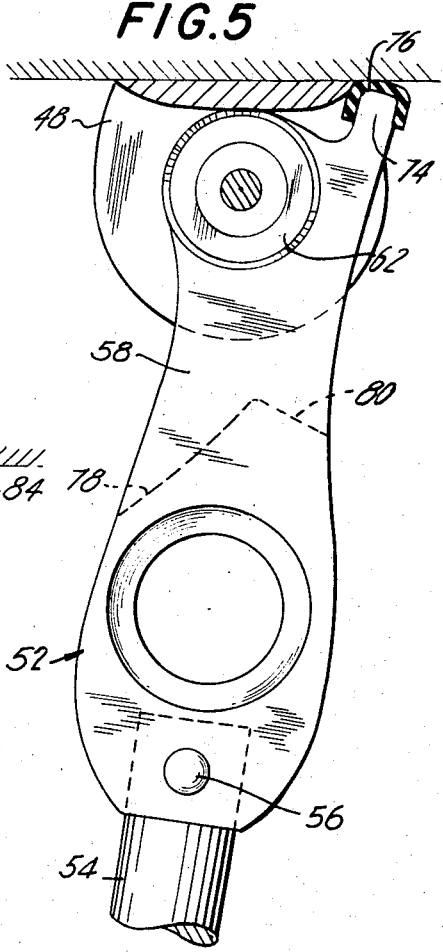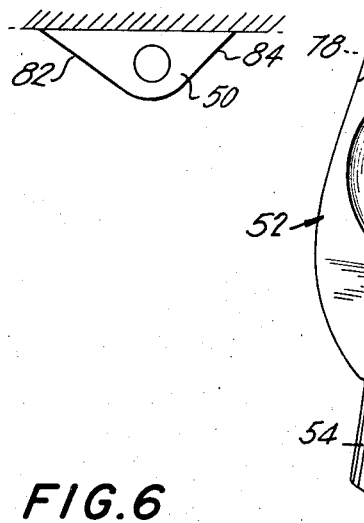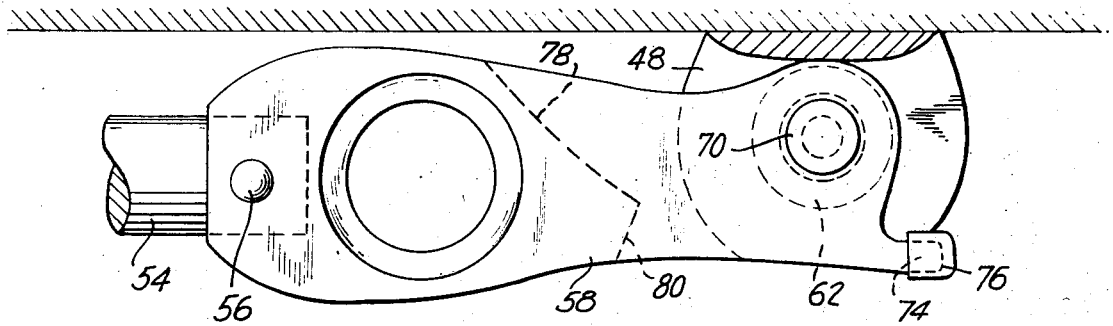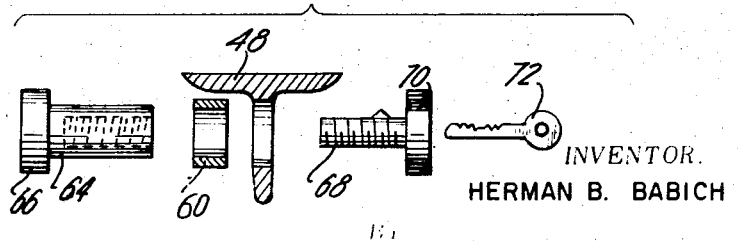

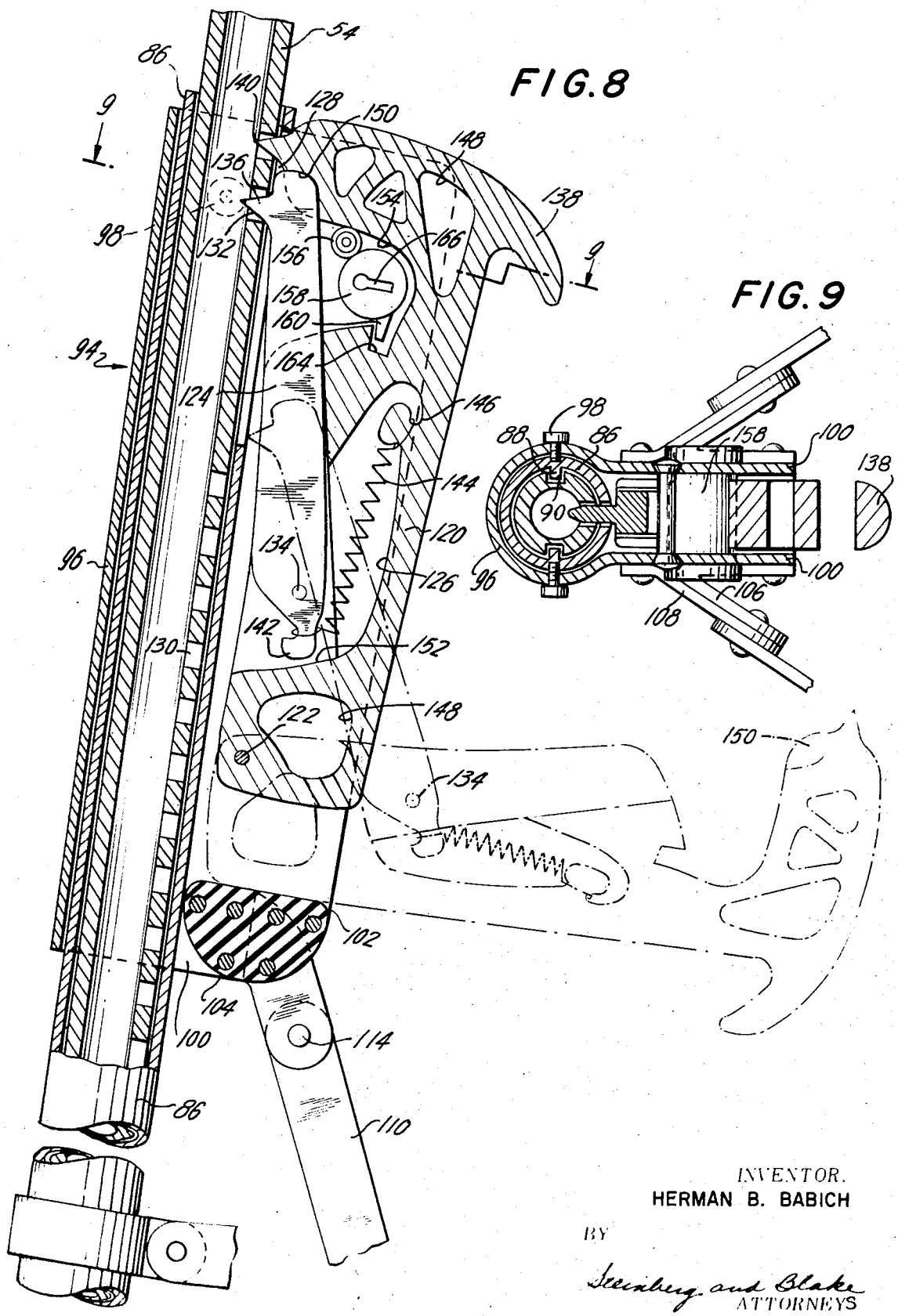

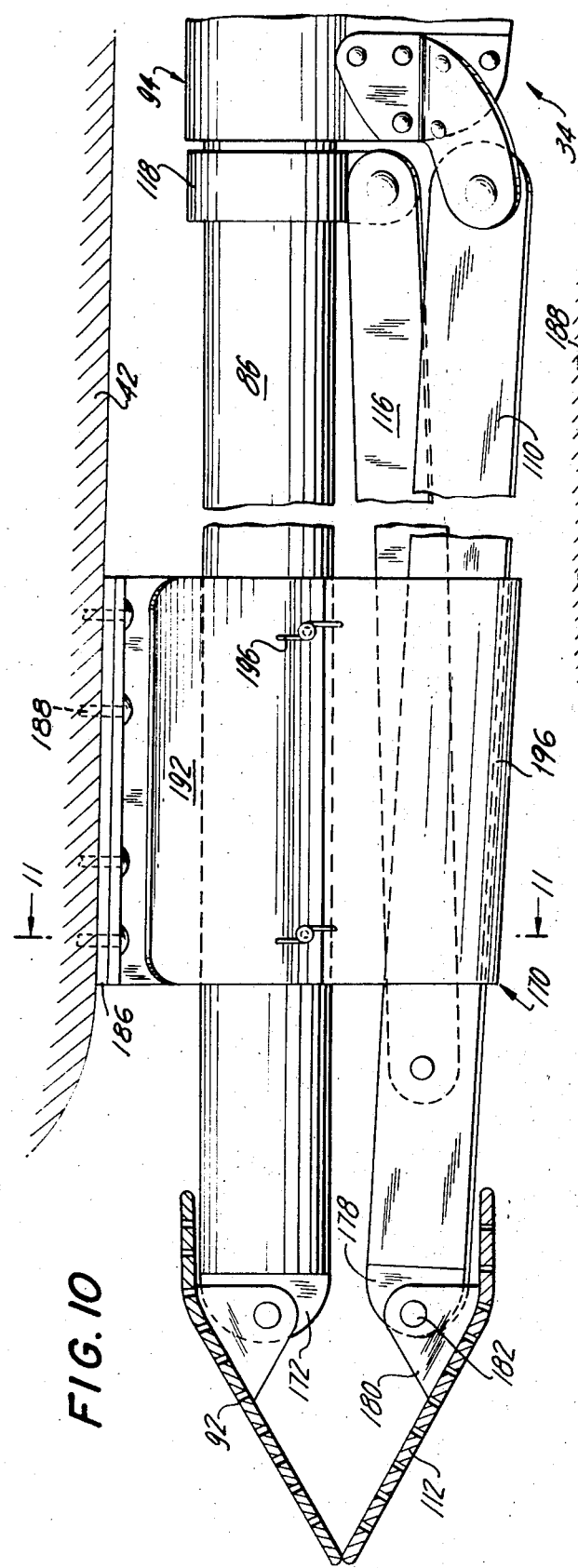
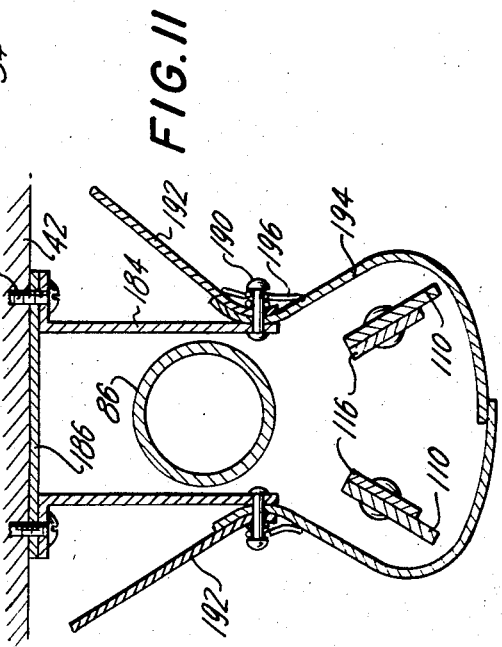
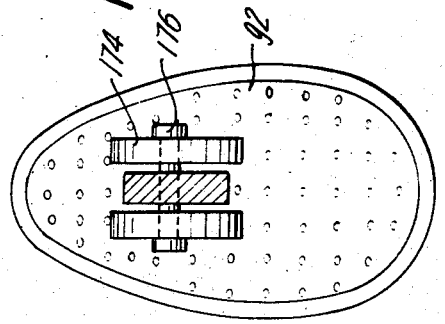
INVENTOR.
HERMAN B. BABICH
BY Steinberg and Blake
ATTORNEYS

SECURING DEVICES TO BE USED WITH AIRCRAFT

BACKGROUND OF THE INVENTION

The present invention relates to aircraft.

More particularly, the present invention relates to devices for securing aircraft to the ground.

At the present time, conventional securing devices take the form of elongated cables, chains, or the like which extend between the aircraft and an anchor permanently fixed to the ground. Although the chain or cable of such conventional devices are very strong and the anchoring component is embedded deeply in the ground, these known securing arrangements suffer from several drawbacks. In the first place, they require suitable anchoring inconvenience to be built into the ground, with the inconveniences of taxiing an aircraft precisely up to a position where it can be effectively secured to the anchors. Furthermore, these devices always have slack in the cables, chains, ropes, or the like, so that in response to a strong wind it is possible for an aircraft to move about, providing sudden tension in the cable or the like with the result that these become broken, with the anchoring components being ripped from the ground in some cases where exceedingly strong winds are encountered, and with damage to the aircraft frequently occurring.

SUMMARY OF THE INVENTION

It is accordingly a primary object of the present invention to provide devices for securing aircraft to the ground in a manner which will avoid the above drawbacks.

In particular, it is an object of the invention to provide securing devices which do not require any permanent anchoring components to be embedded in the ground, thus avoiding the inconvenience of providing such components and the inconvenience of precisely situating an aircraft at a location where it can be properly secured to such components.

It is furthermore an object of the present invention to provide a securing device which will protect an aircraft from the type of damage which can result from securing arrangements which include ropes, cables, chains, or the like, which unavoidably have undesirable slack.

A further object of the present invention is to provide for an aircraft securing devices which will securely maintain the aircraft secured against movement in pitch, roll or yaw, irrespective of the magnitude and direction of winds which engage the aircraft when it is secured.

Furthermore, it is an object of the present invention to provide securing devices which are easily manipulated to be placed either in securing or in-flight positions.

Also, it is an object of the invention to provide securing devices of relatively low cost and light weight which can be readily attached to existing aircraft and which can either be removed when not used, so as to be packed away in the interior of the aircraft, or which can be secured to the aircraft in in-flight positions where they will not undesirably detract from the flying characteristics of the aircraft.

According to the invention the aircraft, which has a fuselage provided with a rear tail region and a forward region carrying a wing which extends laterally from the fuselage on opposite sides thereof, has a plurality of securing means operatively connected to the aircraft for securing the latter to the ground. The plurality of securing means include a rear securing means operatively connected with the rear tail region of the fuselage for movement between a collapsed position of non-use and an expanded position extending and compressed between the fuselage and the ground therebeneath and having a length sufficiently great to place the wing of the aircraft at a non-lift, negative angle of incidence in which the aircraft nose is inclined downwardly. The plurality of securing means also include a pair of forward securing means situated equidistant from the fuselage and operatively connected with the wing for movement between the collapsed positions of non-use and expanded positions extending and compressed between the wing and the ground. These three securing means thus secure the aircraft to the ground, without requiring the use of built-in anchoring components, while at the same time securing the aircraft in a manner which will reliably prevent any undesired movement of the aircraft under all wind conditions. The rear securing means secures the aircraft against pitching movements, while the pair of forward securing means secure the aircraft against rolling movement, and all three securing means secure the aircraft against yaw. The negative incidence of the wing resulting from the length of the rear securing means results in pushing of the aircraft down toward the ground rather than lifting of the latter away from the ground even with low winds which run practically parallel to the ground, so that the aircraft is never raised from the ground by any winds and thus remains reliably secured with the securing devices of the invention in all winds in a manner preventing pitching, rolling, or yaw movements of the aircraft and in a manner preventing any possible setting up of swaying movements in any direction.

BRIEF DESCRIPTION OF DRAWINGS

The invention is illustrated by way of example in the accompanying drawings which form part of this application and in which:

FIG. 1 is a schematic representation of an aircraft provided with the securing devices of the invention;

FIG. 2 is a fragmentary front view of the aircraft of FIG. 1 showing the manner in which a forward securing means can be swung between its expanded position and its in-flight position;

FIG. 4 is a rear elevation taken along line 4—4 of FIG. 3 in the direction of the arrows and fragmentarily showing, at an enlarged scale as compared to FIG. 3, the connecting means for connecting the forward securing means to the wing of the aircraft;

FIG. 5 is a partly sectional and partly schematic side elevation of the connecting means of FIG. 4, taken along line 5—5 of FIG. 4 in the direction of the arrows;

FIG. 6 shows the structure of FIG. 5 swung to its in-flight position;

FIG. 7 is an exploded illustration of the components used to attach the securing means to the eye which is fixed to the wing in the structure of FIGS. 4–6;

FIG. 8 is sectional elevation illustrating the details of a manually operable means used with each forward securing means;

FIG. 9 is a sectional plan view taken along line 9—9 of FIG. 8 in the direction of the arrows;

FIG. 10 is a fragmentary partly schematic side elevation showing a retaining means for retaining a securing means in its in-flight position;

FIG. 11 is a transverse sectional elevation taken along line 11—11 of FIG. 10 in the direction of the arrows;

FIG. 12 is a partly sectional plan view illustrating the details of a foot member connected to the securing means for directly engaging the ground;

FIG. 14 is a side elevation of a rear tail ring secured to the fuselage for enabling the rear securing means to be attached thereto.

DESCRIPTION OF PREFERRED EMBODIMENTS

Figure 3:
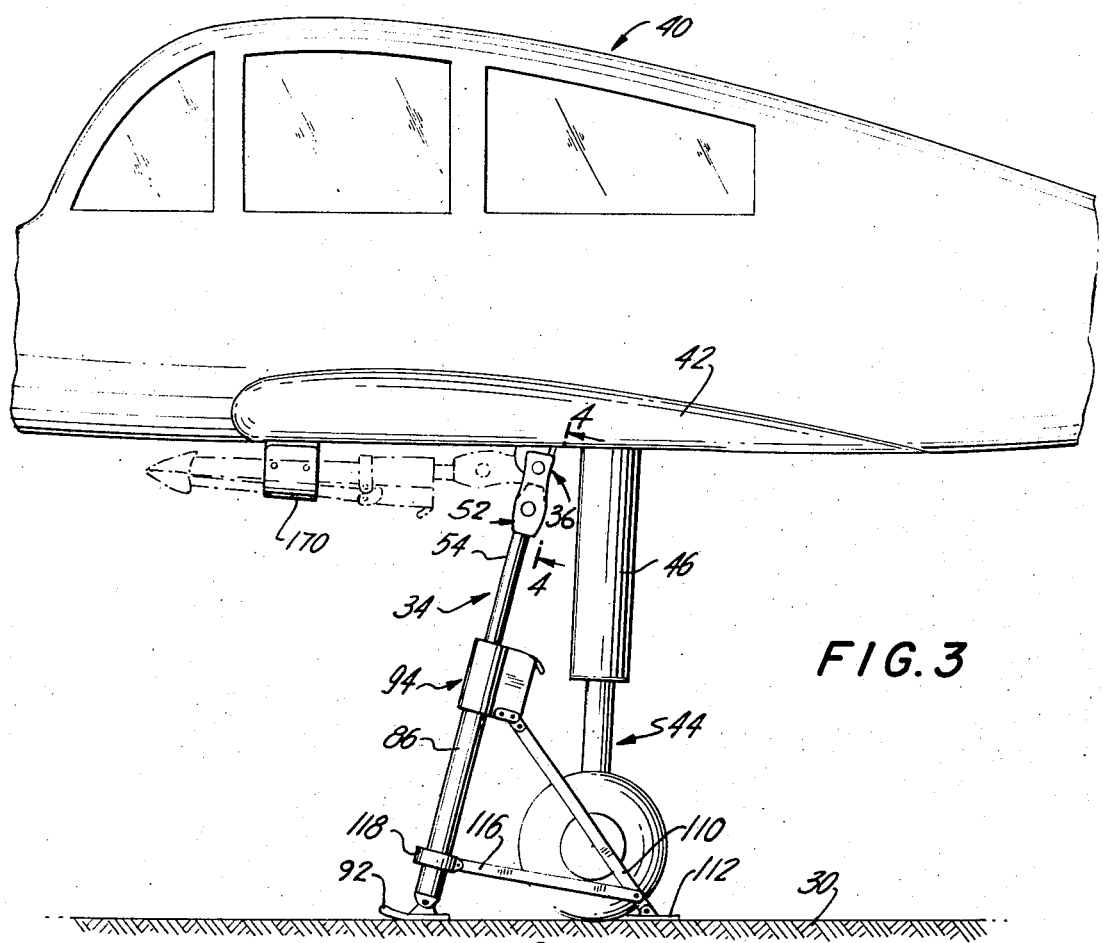
FIG. 3 is a fragmentary side elevation of a forward securing means of the invention shown attached to a low-wing type of aircraft, whereas the aircraft of FIGS. 1 and 2 is a high-wing type of aircraft.

Referring now to FIG. 1, there is illustrated therein an aircraft 20 which is an aircraft of the high-wing type. This aircraft has a fuselage 22 provided with a rear tail region 24. Also, the fuselage has a forward region where the wing 26 is carried by the fuselage, extending laterally therefrom. The wing 26 includes struts 28 by means of which the wing is mounted on the fuselage in a well known manner.

In accordance with the invention the aircraft 20 carries a plurality of securing means for securing the aircraft to the ground 30 which is schematically represented in the drawings. The ground can take any form, such as suitable pavement, concrete or simple soil, grass, or other exposed and untreated ground is perfectly suitable. The plurality of securing means include a rear securing means 32 connected to the rear tail region 24 and having an expanded position extending and compressed between the tail region 24 and the ground 30. In its expanded position the rear securing means 32 has a length sufficiently great to provide the wing 26 with a negative angle of incidence. It will be noted that the securing means 32 has a tripod construction providing a three-point engagement with the ground 30.

The plurality of securing means also include a pair of forward securing means 34 which have the expanded positions illustrated in FIG. 1 where the pair of forward securing means 34 extend and are compressed between the wing 26 and the ground 30. The pair of forward securing means 34 have a length sufficient to flex the wing 26 upwardly so as to be compressed between the wing 26 and the ground 30.

A plurality of connecting means 36 serve to connect the plurality of securing means, respectively, to the aircraft. The several connecting means 36 are capable of removably connecting the securing means to the aircraft or the connecting means 36 can serve to connect the securing means to the aircraft for swinging movement between the solid-line expanded position shown in FIG. 2 for one of the forward securing means 34 and the in-flight collapsed position indicated in dot-dash lines in FIG. 2. In the example of FIG. 2 each of the forward securing means 34 extends, in its in-flight position, along a strut 28, and a releasable retaining means 38, the details of which are referred to below, serves to releasably retain each securing means in its in-flight position. The rear securing means 32 can also be collapsed so as to be capable of assuming an in-flight condition releasably retained against the underside of the fuselage with the rear securing means 32 swung forwardly from the connecting means which connects it to the rear tail region 24.

As will be apparent from the description which follows, each securing means of the invention is of a relatively light-weight construction. Nevertheless, the rear securing means 32 when swung upwardly to its in-flight condition is partially expanded so as to have a length greater than its fully collapsed length but shorter than its fully expanded length, so that in this way the center of gravity of the rear securing means 32 will be displaced forwardly beyond the location which it would assume if the rear securing means were fully collapsed while in flight, and thus any undesirable influence on the aircraft resulting from the weight of the rear securing means at the rear of the aircraft is greatly diminished.

FIG. 3 illustrates an aircraft 40 of the low-wing type to which the securing devices of the invention are attached. These securing devices with an aircraft as shown in FIG. 3 are identical to those used with an aircraft as shown in FIG. 1, the only difference being that in the case of FIG. 3 the forward pair of securing means 34 will have an in-flight position, indicated in dot-dash lines in FIG. 3, where they extend along the lower surface of the wing 42. It is to be noted that in this case also the rear securing means will provide for the wing 42 a negative angle of incidence when the rear securing means 32 is in its expanded position. It is also to be noted that each securing means has a tripod structure providing a three-point engagement of each securing means with the ground 30.

It is furthermore to be noted that each aircraft has a landing-gear assembly 44 provided with a shock-absorbing means 46 which normally permits the aircraft to yield vertically in response to engagement of ground irregularities by the wheels of the aircraft during travelling of the latter on the ground. The rear securing means 32 when in its expanded position not only provides the wing 42 with a negative angle of incidence but also eliminates any play or movement in the shock-absorbing means 42 with the latter being placed in its fully collapsed position by the rear securing means 32 when the latter is expanded to its expanded position extending and compressed between the fuselage and the ground, so that in this way any possible pitching movement of the aircraft is reliably avoided. As was pointed out above the negative angle of incidence will cause the aircraft to be pushed downwardly toward the ground in response to engagement of air currents with the aircraft, and the several securing means of the invention coact with the aircraft to eliminate all movements in pitch, roll, and yaw, irrespective of the wind direction and the magnitude of the wind speed.

In order to connect the securing means of the invention to the aircraft, the aircraft will have fixed thereto a ring or eye 48, for connection of the pair of forward securing means 34 to the wing of the aircraft, while a different type of eye or ring 50 (FIG. 14) is used for the rear securing means 32.

Each securing means has an upper component 52 in the form of a suitable casting, for example. This component may be cast in one piece, although it is possible to make it in two parts which are connected to each other by suitable rivets or the like, for example. The component 52 may be made of a suitable metal and has a free end provided with a bore for receiving a tube 54 of each securing means. The tube 54 may be fixed to the connecting component 52 of connecting means 36 by way of a suitable cross pin or rivet 56. Each component 52 is provided with a pair of mutually spaced walls 58 between which the eye 48 becomes located when the connection is made. As is apparent from FIGS. 4 and 7, there is situated within each eye 48 a sleeve 60 which thus becomes situated between the walls 58, filling the gap therebetween and having an outer diameter substantially equal to the inner diameter of the eye 48. The portions of walls 58 situated on opposite sides of the eye or ring 48 are formed with throughbores 62 registering with the bore of sleeve 60, and a mounting bolt 64 passes through the registering bores. This bolt 64 (FIG. 7) has a head or shoulder end 66 engaging the exterior surface of one of the walls 58. At its opposite end the bolt 64 is formed with a threaded bore receiving a lock member 68. This lock member simply slides into the threaded bore of the bolt 64 and itself has a head or shoulder end 70 for engaging the exterior surface of component 52 opposite from that which is engaged by the head end 66. The lock 68 is of the type which has a toothed lock member urged by a spring to an outer locking position so that this lock can simply be pushed into the bolt 64 with the lock member 68 jumping automatically into a thread for locking the bolt 64 in its position holding component 52 on the eye 48. A key 72 can be inserted into the lock 68 for retracting the tooth thereof when it is desired to remove the lock member for detaching the securing means. Thus, each connecting means provided with the details shown particularly in FIGS. 4 and 7 will serve on one hand to swingably connect a securing means to the aircraft for movement between the expanded park and collapsed in-flight positions on the other hand for removably connecting the securing means to the aircraft so that if desired the securing means can conveniently be removed and of course again attached to the aircraft whenever desired. Thus a semi-permanent attachment is achieved by each connecting means.

As will be apparent from the description which follows, each securing means takes the form of telescoped tube assembly so that it has an elongated configuration provided with the lower tripod construction for directly engaging the ground. In their expanded positions the pair of forward securing means 34 are inclined forwardly and downwardly from the wing of the aircraft, while the rear securing means 32 is inclined downwardly and rearwardly from the fuselage. This is apparent from FIG. 1, for example. In order to achieve this inclination with the pair of forward securing means, the walls 58 thereof terminate in rear upper projections 74 (FIG. 5) covered with suitable cups 76 made of rubber or other yieldable material so that these components 76 can directly engage the aircraft while limiting the extent of swinging movement of each securing means from its in-flight position to its expanded position of use, and thus, as is particularly apparent from FIG. 5 it is possible through this limiting means to determine the inclination of the securing means when the latter is in its expanded position.

Between the side walls 58 each component 52 has an inclined flight stop surface 78 and a park stop surface 80. The inclinations of these surfaces are apparent from FIGS. 5 and 6. As may be seen from FIG. 14 the rear eye or ring 50 has a forward edge 82 of predetermined inclination and a rear edge 84 of predetermined inclination. The inclination of the edges 82 and 84 is such that when the rear securing means is in its in-flight position the inclined inner surface 78 of the component 52 engages the edge 82 of the ring or eye 50. However, when the rear securing means 32 is placed in its expanded position of use, indicated schematically in FIG. 1, the park-stop surface 80 between the walls 58 engages the inclined edge 84 so as to determine in this way the downward and rearward inclination of the rear securing means. Thus, it becomes possible to use one component 52 for all of the securing means, achieving a uniformity of construction with each component 52 being capable of use either with an eye 48 or an eye 50. It is to be noted that the fuselage curves upwardly at the region of the ring or eye 50 to an extent sufficient to prevent any engagement of the projection 74 and its cup 76 with the fuselage when the rear securing means 32 is swung to its expanded position. At this time it is the surface 84 which coacts with the surface 80 in order to determine the downward and rearward inclination of the rear securing means 32.

Figure 13:
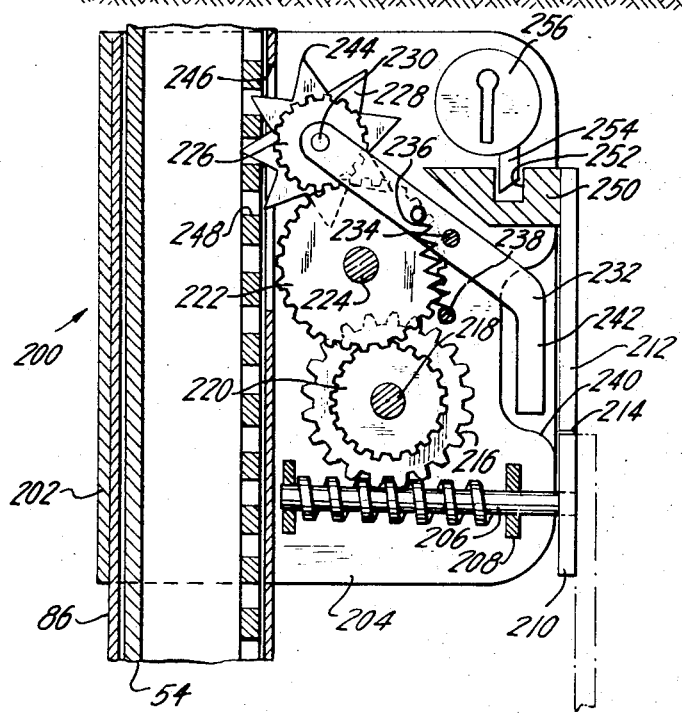
FIG. 13 is a schematic sectional elevation of a manually operable means operatively connected with the rear securing means for expanding the latter.

In addition to the above-described connecting means 36 for connecting each securing means to the aircraft, each securing means is provided with a manually operable means manipulated by the operator for the purpose of expanding the securing means. The details of the manually operable means used with each of the forward securing means 34 are illustrated in FIGS. 8 and 9, while the details of the manually operable means used with the rear securing means 32 are illustrated in FIG. 13.

Referring first to FIGS. 8 and 9, it will be seen that the tube 54, the upper end of which is shown in FIGS. 4–6, forms the inner tube of a telescoped tube assembly which forms the main structure of each forward securing means. This tube 54 is in the form, in the illustrated example, of an extrusion having at its exterior parallel longitudinal grooves which extend axially along the extrusion which forms the tube 54. The outer tube 86 of the telescoped tube assembly which forms each forward securing means 34 is in the form of an extrusion having inner parallel ribs extending parallel to the axis of the tube 86, and these ribs 88 are received in the grooves 90 of the inner tube 54, so that in this way the tubes are telescoped to form an extendable and collapsible assembly for each forward securing means 34. The inner tube 54 is of course permanently fixed with the component 52 of the connecting means 36, by the cross pin 56, for example, as pointed out above.

As is apparent from FIG. 3, the outer tube 86 terminates at its end distant from the tube 54 in a foot member 92 adapted to engage the ground and swingably connected to the free end of the outer tube 86 in the manner described in greater detail below.

Adjacent its upper end the outer tube 86 fixedly carries a manually operable means 94, the details of which are illustrated in FIG. 8. This manually operable means 94 includes an outer supporting bracket 96 which partly surrounds and extends beyond the outer tube 86. The bracket 96 may be fixed in any suitable way to the tube 86, as by suitable screw members 98 or the like, as indicated in FIG. 9. The bracket 96 has a pair of spaced parallel walls 100 which extend beyond the outer tube 86, as shown most clearly in FIG. 9.

At its lower right region, as viewed in FIG. 8, the bracket 96 fixedly carries between the walls 100 a rubber abutment block 102, for a purpose referred to below. Fastening pins or rivets 104 extend through the block 102 and to the exterior of the walls 100 for fixing to the exterior surface of each wall 100 a V-shaped component 106 and an outer component 108, these components serving to hingedly connect to each wall 100 a swingable brace-leg or link 110 which at its outer end carries a foot 112, so that in this way each securing means has a tripod structure at its lower end region which directly engages the ground 30. The pair of links 110 are hinged to the components 106 and 108 by a suitable pin or rivet 114. At their lower ends, as shown in FIG. 3, the components 110 are respectively hinged with a pair of links or braces 116 which in turn are hinged to a ring 118 which is freely slidable along each tube 86 for the purpose of collapsing and expanding the tripod structure. Thus, when the ring 118 of FIG. 3 is shifted downwardly it will swing the links 110 outwardly so as to spread the feet 92 and 112 apart from each other to provide the tripod structure with its three-point engagement with the ground 30. On the other hand when the sleeve or ring 118 is slipped along the tube 86 back toward the manually operable means 94, the links 110 will swing inwardly and the structure will assume its collapsed position shown in FIG. 10 in greater detail and described below.

The manually operable means 94 includes between the walls 100 a manually engageable lever 120. This lever 120 is pivoted to the bracket 96 between the walls 100 thereof by a suitable elongated pivot pin 122. The manually engageable lever 120 is swingable between the solid-line position indicated in FIG. 8 and the dot-dash line position. When swung outwardly to the latter position the lever 120 engages the rubber block 102 so that the latter acts as a cushion for the lever 120 and limits the outward swinging thereof.

The lever 120 itself carries an expanding lever 124, and for this purpose the lever 120 is formed between its sides with an internal elongated groove 126 which partly receives the expanding lever 124, the latter projecting outwardly beyond the groove 126 in the manner clearly shown in FIG. 8.

The outer tube 86 is formed with an elongated slot 128 while the inner tube 54 is formed with a series of openings 130 as well as with an upper pair of openings 132.

The expanding lever 124 is hinged by a pin 134 to the manually engageable lever 120, and this lever 124 has a tooth 136 adapted to extend through the slot 128 and into one of the openings 130 or 132. The manually engageable lever 120 has an extension 138 for convenient grasping thereof. Opposite to the extension 138 the lever 120 carries also a tooth 140 adapted to extend through the slot 128 and into one of the openings 130 or 132.

The expanding lever 124 terminates at its end distant from its tooth 132 in a hook portion 142 to which one end of a coil spring 144 is hooked. The other end of the coil spring 144 is hooked on to a hook portion 146 forming part of the manually engageable lever 120. This lever 120 may be formed with suitable openings 148 for the purpose of reducing the weight of the manually operable means. In addition adjacent its tooth 140 the manually engageable lever 120 is formed with a groove 150 for receiving the free end of the expanding lever 124 when the parts are in the solid-line position of FIG. 8. It is to be noted that the configuration of the groove 126 is such that it has a stop surface 152 against which the lever 124 is pressed by the spring 144 when the lever 120 is moved out to the dot-dash line position indicated in FIG. 8.

In order to hold the structure securely in the position shown in FIG. 8, the walls 100 are formed with a pair of openings registering with the transverse notch 154 of the lever 120. It will be noted that in the region of the notch 154, when the parts are in the solid line position of FIG. 8, the walls 100 are also held together by a transverse rivet 156. The registering openings of walls 100 and the notch 154 serve to receive a cylindrical lock member 158 which is of the spring-loaded latch type and remains permanently mounted on walls 100. It has opposed head ends for engaging the exterior surfaces of the walls 100. Along its interior cylindrical portion which becomes situated within the notch 154 the lock 158 has a locking tooth or latch 160 capable of snapping into the notch or bore 164 which is formed in the lever 120, so that in this way it becomes possible to lock the structure in the solid line position shown in FIG. 8. On the other hand the operator can at any time insert a suitable key into the key-receiving portion 166 of the lock 158, in order to retract the tooth 160, so that the lever 120 can then be swung out to the dot-dash line position indicated in FIG. 8.

The operation of each forward securing means 34 is believed to be clear. Assuming that an aircraft has arrived at a given location, as illustrated, for example, in FIG. 3, the operator will simply release each securing means 34 so that it can swing down from the dot-dash line position of FIG. 3 to the solid line position, the projection 74 and cap 76 determining the extent of forward inclination of each forward securing means 34, as described above. In the collapsed position the manually operable means is locked by the lock means 158 in the manner described above and shown in solid lines in FIG. 8. At this time the tooth 136 of lever 124 is in the lower opening 132 while the tooth 140 of the lever 120 is in the upper opening 132. Before the structure is released, the ring 118 is displaced down toward the foot 92 so as to swing the tripod legs 110 outwardly. Then the key is applied to lock 158 to retract latch 160 so that lever 120 is released to allow tube 86 to fall by gravity downwardly along tube 54 until the feet 92 and 112 engage the ground 30.

The operator will now swing the lever 120 outwardly to the dot-dash line position, and it will be noted that the spring 144 will now act to situate the expanding lever 124 at an attitude which is generally upright and substantially at right angles to the horizontal lever 120. Now the operator will simply swing the lever 120 back, and it is apparent that the tooth 136 of the expanding lever will enter into one of the openings 130, while the operator continues to return the lever 120 back to the solid line position, the result being that the lever 124 acts on the inner tube 54, in one of the openings 130 thereof, to displace the inner tube 54 upwardly with respect to the outer tube 86, and this displacement will take place until the tooth 140 of lever 120 becomes situated in an opening 130 over that which is occupied by the tooth 136, and now the spring latch 160 will snap into notch 164 so as to lock the structure in the expanded position.

It is apparent, therefore, that the manually operable means 94 of each forward securing means 34 is a one-stroke type of expanding structure which only requires the operator to swing the lever 120 first out until it engages the rubber block 102 and then back, for the purpose of expanding the forward securing means to its expanded position where it is compressed between the wing 42 and the ground 30, flexing the wing 42 upwardly to create the necessary securing pressure.

When it is desired to take off, the reverse of the above operations are carried out.

In this connection, referring to FIGS. 3 and 10–12, it will be seen that the wing 42 carries for each securing means 34 a releasable retaining means 170 which serves to releasably retain each securing means 34 in the in-flight position shown in FIG. 10. It will be noted that in this position the ring 118 has been slipped back to its rest position adjacent the manually operable means 94, and the links 116 are adjacent and extend along the outer tube 86 while the links 110 also are adjacent to and extend along the links 116. It is to be noted that each tube 86 is plugged at its lower end with a plug carrying a fin 172 received between a pair of ears 174 (FIG. 12) fixed to and extending from the foot 92, and a suitable hinge pin 176 is provided so that the foot 92 is freely swingable on the fin 172. In the same way the links 110 terminate in fins 178 received between ears 180 of each foot 112 with a suitable hinge pin 182 being provided to interconnect the ears 180 with the fin 178. When the tripod structure is swung out to its position shown in FIG. 3, the feet 92 and 112 will automatically assume whatever inclination the ground 30 calls for.

The releasable retaining means 170 includes a pair of elongated bracket members 184 fixed in any suitable way to the wing 42 with a suitable plate 186 being interposed between the wing 42 and fixing flanges of the brackets 184, suitable screws 188 being provided for the purpose of fixing the walls 184 to the wing 42, as shown in FIG. 11. At their edges distant from the wing 42 the brackets 184 are connected by rivets 190 to manually turnable levers 192 in the form of suitable elongated plates which extend along the walls 184, respectively. These levers are situated outwardly of and engage a pair of swingable retaining members 194, respectively. Suitable wire springs 196 are provided around the rivets 190. The arrangement is such that the operator can push the lever plates 192 toward each other so as to spread the retaining members 194 apart in order to release the securing means 34 for movement from its in-flight to its park position and also for receiving the collapsed securing means 34 when the latter is returned from the park to the in-flight position shown in FIG. 10.

The rear securing means 32 is identical with each forward securing means 34 except for the manually operable means illustrated in FIG. 13 and described below. A releasable retaining means 170 is also provided at the underside of the fuselage 22 for the purpose of releasably retaining the rear securing means 32 in its in-flight position. However, it is preferred when the securing means 32 is placed in its in-flight position to place it in a condition somewhat longer than its fully collapsed length but shorter than its expanded length, so that the center of gravity of the rear securing means 32 will be displaced forwardly beyond the location it would assume if it were in its fully collapsed position, and in this way the influence of the weight of the securing means 32 on the aircraft is diminished.

The rear securing means 32 has telescoped tubes which may be identical with those of each forward securing means. However, the manually operable means 200 of the rear securing means has, as shown in FIG. 13, a bracket 202 which is fixed to the outer tube 86 in any suitable way and which has a pair of walls 204 between which the mechanism of the manually operable means 200 is located. This mechanism includes a rotary worm 206 supported for rotation by transverse bearing plates 208 fixed between the walls 204. At its outer end the worm 206 is fixed with a portion 210 of a hand crank 212. This hand crank 212 has a manually engageable portion hinged at 214 to the portion 210. When the portion 212 is swung out to the dot-dash line position indicated at the lower right in FIG. 13, the crank can be turned by the operator for the purpose of rotating the worm 206.

The worm 206 meshes with a worm wheel 216 supported for rotation on a shaft 218 fixedly carried by and extending between the walls 204. The worm 216 is coaxially fixed with a gear 220 which meshes with a second gear 222, and this second gear is supported for rotation on a suitable shaft 224 which extends between and is carried by the wall 204. The second gear 222 meshes with a third gear 226 coaxially fixed with a toothed member 228, and the members 226 and 228 are supported for rotation on a shaft 230 which is carried by a lever 232 supported for swinging movement on a pin 234 which is carried by and extends between the walls 204. A spring 236 is connected at one end to a pin carried by the lever 232 and at its opposite end to a pin 238, so that this spring 236 acts to maintain the gear 226 in mesh with the gear 222. However, the walls 204 are provided with suitable notches 240 giving the operator free access to the free end 242 of the lever 232, so that by pressing on the free end 242 the operator can swing the lever 232 in a clockwise direction, as viewed in FIG. 13, about the pin 234 and in opposition to the spring 236 so as to place the gear 226 out of engagement with the gear 222 for a purpose referred to below.

The member 228 is provided with teeth 244 adapted to extend through a slot 246 formed in the wall of the outer tube 86, and in this way the teeth 234 can reach the openings 248 which are formed in the inner tube 54, distributed axially therealong.

It will be noted that when the portion 212 of the lever which turns the worm 206 is in its solid line position, a handle 250 is received between the walls 204. This handle is formed with a bore or notch 252 which receives a spring-pressed lock pin 254 of a lock 256 which may be identical with the lock 158. The walls 204 are formed with registering openings for receiving the lock 256 which can be placed in the position shown in FIG. 13 with the lock pin 254 received in the opening 252 for locking the handle 250 and the lever portion 212 in the illustrated solid-line position, thus preventing access to the portion 242 of the lever 232.

With this construction when it is desired to use the rear securing means 32, the operator will actuate the releasable retaining means 170 at the rear of the aircraft so that the rear securing means 32 can swing down toward its operative position. The operator will of course expand the tripod structure to assume its operative position, and the walls 204 are connected to the swingable brace-legs 110 in the manner described above in connection with the manually operable means 94. This structure is omitted from FIG. 13 for the sake of clarity. With the tripod structure thus extended, the operator will apply a key to the lock 256 and upon retracting latch 254 will swing the lever portion 212 to the dot-dash line position, by way of the hinge connection 214. Now the operator will press the free end 242 of the lever 232 so as to displace the gear 226 away from the gear 222 and so as to move the teeth 244 of member 228 out of the openings 248. The outer tube 86 can slip down along the inner tube 54 until the feet 92 and 112 engage the ground. It is to be remembered that these operations will take place while the pair of forward securing means 34 remain in their in-flight positions. With the rear securing means now in engagement with the ground, the operator will release the lever 232 so that the teeth 244 will enter into the openings 248. Now the operator will turn the crank lever 212 so as to rotate the worm 206 and thus cause the inner tube 54 to be displaced outwardly of the outer tube 86. In this way the rear securing means 32 is continuously expanded, and the expansion is continued by the operator until the front nose section of the aircraft is inclined downwardly and the wing 42 is provided with a negative angle of incidence and until the shock-absorbing means 46 no longer has any play therein, as pointed out above. Now the operator will return the lever 212 to its solid-line position indicated in FIG. 13, and the latch 254 of lock 256 will enter notch 252. At this time the operator will manipulate the pair of front retaining means 170 to release the pair of forward securing means 34 for movement from their in-flight positions to their park positions, and these forward securing means 34 are manipulated by way of the manually operable means 94, through the one-stroke operation thereof, for flexing the wing 42 upwardly, and thus applying compression to the pair of forward securing means while the rear securing means 32 remains in the above position.

Through these simple operations the entire aircraft is reliably secured to the ground and is prevented from any pitching, rolling, or yaw movements irrespective of the direction or power of the air currents, as referred to above.

It is to be noted that in general each securing means will require only a pair of telescoped tubes, as described above. However, when using the device of the invention with a high-wing aircraft, as shown in FIGS. 1 and 2, it may be desirable to add a third tube to the telescoped assembly. For this purpose the tube 54 can receive in its interior a further tube 260 which is connected by a connecting means 36 to the strut 28 of the wing 26, and the releasable retaining means 38 shown in FIG. 2 is situated along the strut 28 but otherwise has a construction identical with the releasable retaining means 170 described above. At its upper end the tube 54 of such a construction can be provided with a collar 262 carrying a pair of diammetrically opposed pins which are fixed to the collar and project therefrom along a common diameter inwardly toward the center of the collar 262. These pins are received in a pair of exterior grooves extending axially along the tube 260 and being of the same construction as the grooves 90 shown in FIG. 9, so that in this way the tube 54 will be guided with respect to the tube 260. The grooves of the latter are provided at their lower ends with shoulders or end-closure elements for engaging the pins extending inwardly from the collar 262, so that in this way the downward movement of the tube 54 with respect to the tube 260 is limited.

It is thus apparent that with the above structure of the invention it is unnecessary to provide any anchoring components embedded in the ground. There are no elongated elements such as cables, chains, or the like, which will unavoidably have undesirable slack therein. The securing devices of the invention can be attached to any type of aircraft, and may form either a permanent part thereof, or they can be removably connected, as described above. If desired, the securing devices can be packed away in the interior of the aircraft. However, for aircraft of the type shown in the drawings and described above the securing devices can be swingably connected to the exterior of the aircraft for movement between the in-flight and park positions referred to above. Aircraft provided with the securing devices of the invention can be parked at virtually any desired location at any airport and will reliably remain in their parked positions irrespective of weather conditions, as pointed out above. Because of the use of lock devices, namely devices 158 and 256, which require keys in order to release them, the securing devices of the invention will remain in their securing positions until an authorized individual releases them for operation, so that disturbance or theft of the parked aircraft is reliably prevented. The use of a key-and-lock type of component 68 at the connecting means 36 is also of significance in this connection, since it prevents unauthorized removal of an entire securing device.

Most of the components are readily manufactured from light-weight metals such as aluminum, so that each securing means is easily handled for installation and operation purposes.

What is claimed is:

1. For use with an aircraft having a fuselage provided with a rear tail region and a forward region where a wing extends laterally from said fuselage on opposite sides thereof, a plurality of securing means for securing the aircraft to the ground, said plurality of securing means including a rear securing means operatively connected to said rear tail region of said fuselage for movement between a collapsed position of non-use and an expanded position extending and compressed between the fuselage and the ground and placing said wing at a negative angle of incidence, said plurality of securing means including also a pair of forward securing means situated equidistant from said fuselage and operatively connected to said wing for movement between collapsed positions of non-use and expanded positions flexing said wing upwardly while extending and compressed between said wing and the ground therebeneath, and manually operable means operatively connected with each of said securing means for placing the latter in its expanded position.

2. The combination of claim 1 and wherein a plurality of connecting means respectively connect said plurality of securing means semi-permanently to the aircraft, so that each securing means can be removed from and attached to the aircraft.

3. The combination of claim 1 and wherein a plurality of connecting means respectively connect the plurality of securing means to the aircraft for swinging movement with respect thereto between said expanded positions and in-flight positions where said plurality of securing means are elevated away from the ground.

4. The combination of claim 3 and wherein a plurality of releasable retaining means coact with said plurality of securing means, respectively, for releasably retaining them in their in-flight positions.

5. The combination of claim 4 and wherein said rear securing means extends forwardly from its connection to said fuselage when said rear securing means is in its in-flight position, and the retaining means which coacts with said rear securing means retaining the latter in its in-flight position at a length greater than its fully collapsed length but less than its expanded length, so that the center of gravity of said rear securing means will be situated forwardly beyond the position which it would occupy if the rear securing means were fully collapsed when in its in-flight position.

6. The combination of claim 1 and wherein the aircraft includes a landing-gear assembly having a shock-absorbing means yieldable for absorbing shocks and capable of assuming a collapsed position where there is no play in said shock-absorbing means, said rear securing means when in its expanded position placing said shock absorbing means in its collapsed position where there is no play in said shock-absorbing means.

7. The combination of claim 1 and wherein said rear securing means is in the form of an assembly of telescoped tubes while said manually operable means operatively connected therewith includes a rotary crank and gear transmission operatively connected with the telescoped tubes for acting thereon until said rear securing means reaches said expanded position thereof.

8. The combination of claim 1 and wherein each of said forward securing means includes an assembly of telescoped tubes for gravitationally assuming an elongated condition extending from the wing down to the ground, and said manually operable means being a one-stroke means for expanding the forward securing means to a length greater than that which it has when extending freely from the wing to the ground by a given increment resulting from a one-stroke manipulation of the latter manually operable means.

9. The combination of claim 8 and wherein each forward securing means includes an inner tube connected with the wing and an outer tube slidable along the inner tube to extend from the latter to the ground, said manually operable means which is operatively connected to each of said forward securing means including a bracket fixed to said outer tube, a manually engageable lever swingable on said bracket, and an expanding lever swingable on said manually engageable lever, said tubes of each forward securing means being formed at said inner tube with at least one opening and at said outer tube with an opening communicating with said one opening, said expanding lever having a tooth for extending into said one opening of said inner tube for expanding said forward securing means when said manually engageable lever is swung from an outer position to an inner position extending along the tubes of the forward securing means.

10. The combination of claim 1 and wherein each securing means has a lower region of tripod configuration having a three-point engagement with the ground.

* * * * *